Figure 1:
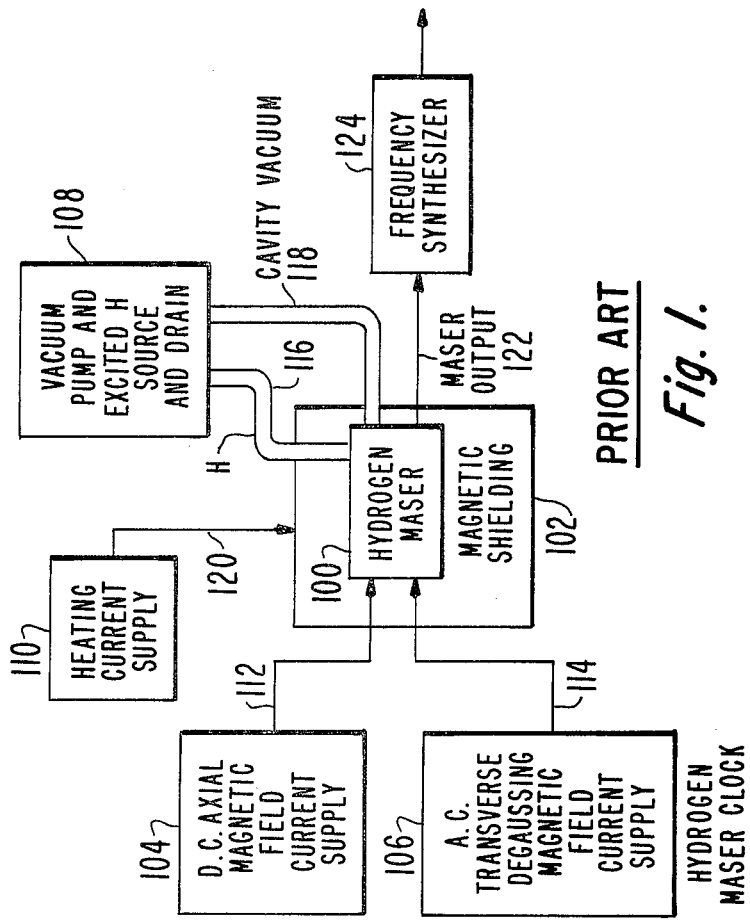

United States Patent [19]

Goldberg

[11] 4,286,304
[45] Aug. 25, 1981

[54] DEGAUSSING ARRANGEMENT FOR MASER SURROUNDED BY MAGNETIC SHIELDING

[75] Inventor: Edwin A. Goldberg, Princeton, N.J.

[73] Assignee: RCA Corporation, New York, N.Y.

[21] Appl. No.: 15,246

[22] Filed: Feb. 26, 1979

[51] Int. Cl.³ .......................... H01S 1/00; H01F 13/00
[52] U.S. Cl. ...................... 361/149; 331/94; 361/146
[58] Field of Search ........................ 361/149, 150, 143; 331/94, 3

[56] References Cited

U.S. PATENT DOCUMENTS

| | | | |
|---|---|---|---|
| 3,345,581 | 10/1967 | Vessot | 331/94 |
| 3,462,705 | 8/1969 | Vessot | 331/94 |
| 3,924,200 | 12/1975 | Peters | 331/94 |
| 4,123,727 | 10/1978 | Peters | 331/94 |
| 4,128,814 | 12/1978 | Reinhardt et al. | 331/94 |

Primary Examiner—Harry E. Moose, Jr.
Assistant Examiner—L. C. Schroeder
Attorney, Agent, or Firm—Samuel Cohen; George J. Seligsohn

[57] ABSTRACT

One or more additional helical coil windings (each situated within a space between adjacent ones of a plurality of paced ferromagnetic shielding cans of graduated size and (each one of which encloses all cans smaller than itself), are oriented coaxial with the helical coil winding of the maser itself (situated within the innermost can). This permits optimum degaussing to be achieved with small degaussing current.

9 Claims, 5 Drawing Figures

MAGNETIC SHIELDING

DEGAUSSING ARRANGEMENT FOR MASER SURROUNDED BY MAGNETIC SHIELDING

The Government has rights in this invention pursuant to Contract No. N-00014-75-C-1148 awarded by the Department of the Navy.

This invention relates to an improved degaussing system for a maser and, more particularly, to such a system which is suitable for use in a spacecraft hydrogen maser frequency standard clock.

The use of a maser oscillator to provide an extremely accurate clock is known in the art. A maser comprises excited molecules of a predetermined masing material situated within a resonant cavity, to which a fixed D.C. axial magnetic field is applied. The nominal frequency of oscillation of a maser is inherently determined by the particular masing material employed. However, this nominal maser frequency is slightly modified in accordance with such factors as the strength of the applied D.C. axial magnetic field and the temperature of the masing material. It is therefore essential that spatially both the strength of the magnetic field and the temperature of the masing material be uniform throughout all of the active volume of the masing material giving rise to maser oscillations. Further, the respective absolute values of the aforesaid spatially uniform axial magnetic field and the spatially uniform temperature must temporally remain substantially constant in order to achieve a high-degree of frequency stability over a long period of time.

By placing the maser within the central one of a plurality of individual thermostatically-controlled ovens-within-ovens, the temperature of the resonant cavity, in which is situated the active volume of the masing material, may be set at a desired constant fixed temperature (e.g. 40° C.) with extremely high precision (e.g. in the order of 0.0001°–0.001° C.). This is necessary to maintain the dimensions and consequent resonant frequency of the cavity constant.

The frequency of the hydrogen maser, as affected by the magnetic field, is given by the following equation:

$$\Delta f = 2750 B^2,$$

where $\Delta f$ is the change in frequency in Hertz from a theoretical masing frequency in a zero strength magnetic field, and B is the strength of the magnetic field in Gauss. In practice, small magnetic fields of a 0.001 Gauss or less are used. Since it is the absolute value of such undesired changes which causes the frequency of oscillation of the maser to vary, maximum frequency stability with time is achieved by employing a D.C. axial magnetic field of as low a strength as possible, consistent with the required spatial uniformity of the magnetic strength throughout the active volume of the masing material. However, the distorting effect of small perturbing external magnetic fields (e.g. the earth's magnetic field) upon the spatial uniformity of magnetic strength within the active volume of the maser becomes greater as the strength of the applied D.C. axial field becomes smaller. The solution to this problem is to magnetically shield the maser from external magnetic fields to as great an extent as is practicable. This may be achieved by locating the maser within the innermost one of a plurality (e.g. 4) of spaced, ferromagnetic shields-within-shields. In order to prevent the ferromagnetic shields themselves from producing local perturbing magnetic fields within volume of the active masing material, it is essential that the ferromagnetic shields be degaussed. The present invention is directed to an improved arrangement for degaussing the ferromagnetic shields of a maser.

More particularly, use of the degaussing arrangement of the present invention permits the degaussing current to be reduced by a factor of the order of one hundred or more. A maser clock standard employing the degaussing arrangement of the present invention is adapted to be situated on each of the respective spacecrafts of proposed precise navigation system or of so-called VLBL (very long base line) radio-astronomy interferometer systems, although it is not limited to this particular use or to any use on a spacecraft. In addition, the degaussing arrangement of the present invention provides optimum degaussing by applying the degaussing magnetic field in a direction parallel to the D.C. axial magnetic field (not perpendicular to the D.C. axial magnetic field as in the prior art).

For illustrative purposes, the degaussing arrangement of the present invention is described in connection with a hydrogen maser, since a hydrogen maser is capable of very high precision (an error rate in the range of only one part in $10^{14}$ to one part in $10^{15}$, or even less) and exhibits very high long term stability. This makes a hydrogen maser most suitable for use in a spacecraft. However, it should be understood that the maser degaussing arrangement constituting the present invention may be used in masers employing a masing material other than hydrogen.

Figure 2:
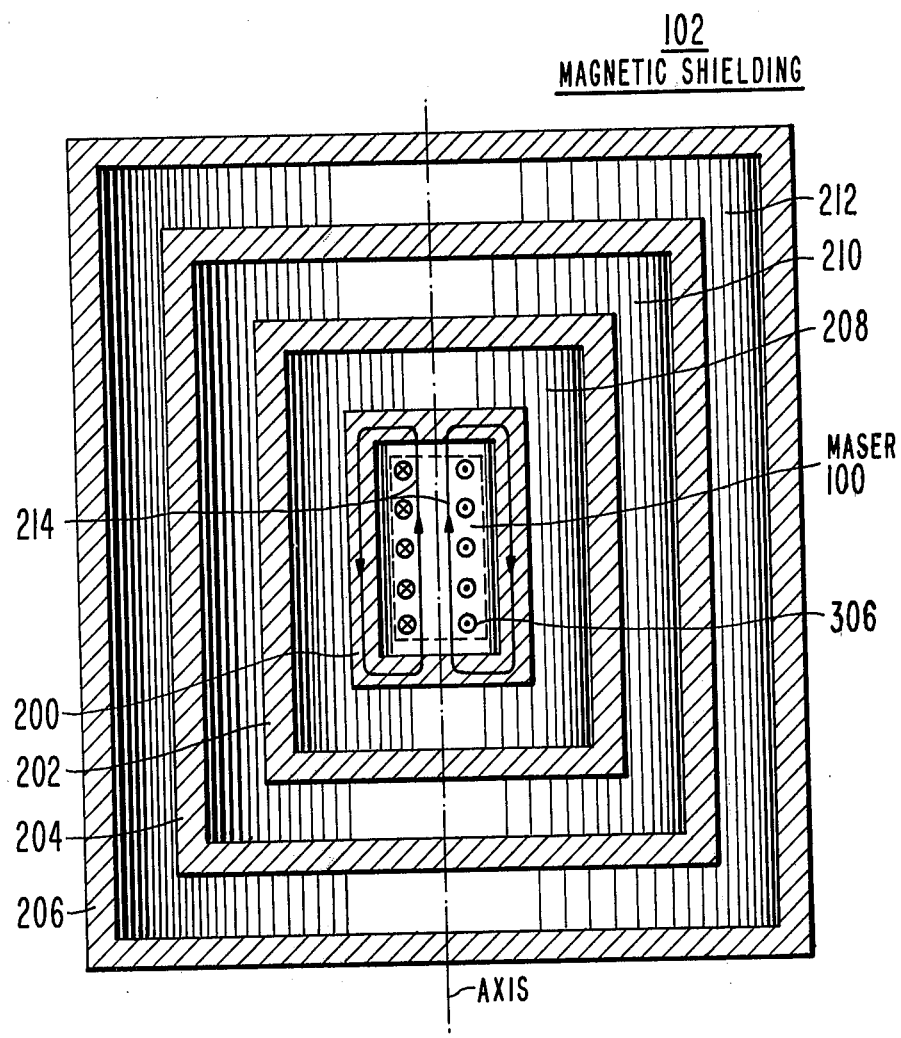
Figure 3:
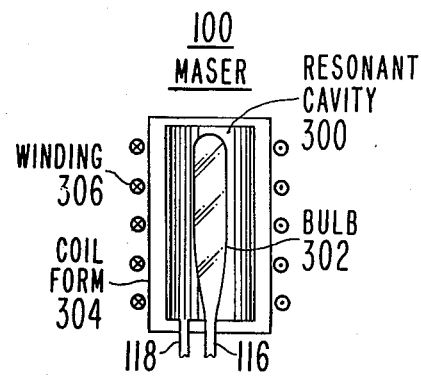
Figure 4:
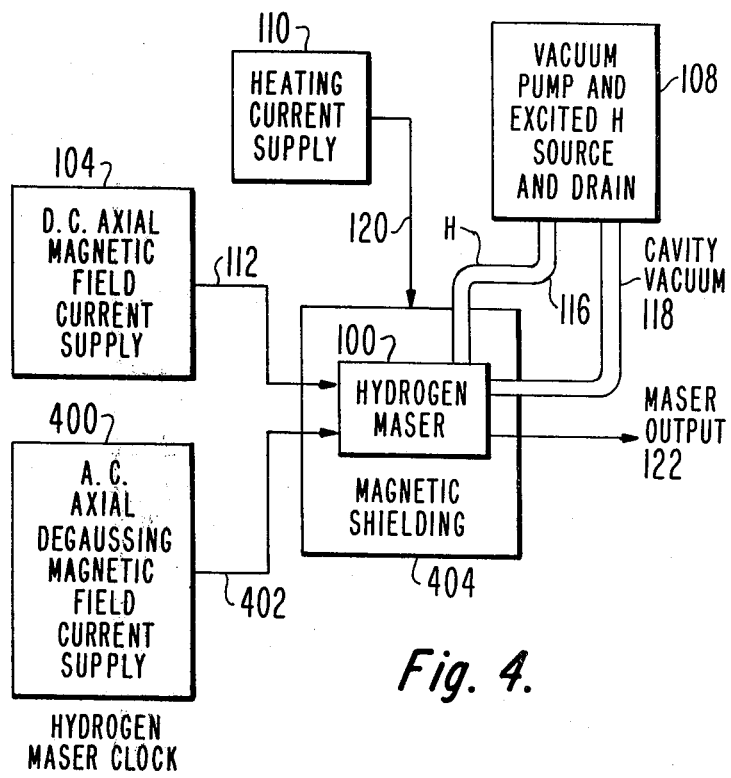
Figure 5:
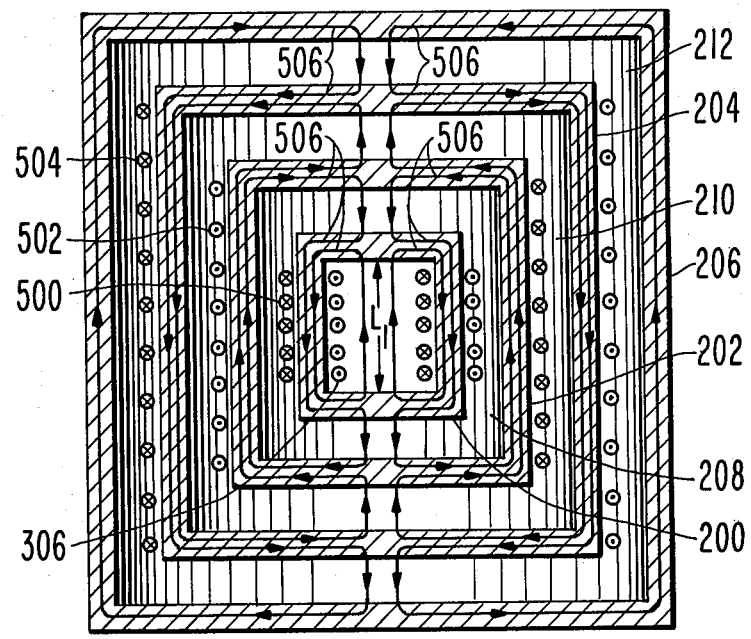

In the drawings:

FIG. 1 is a block diagram of a prior art hydrogen maser clock;

FIG. 2 schematically illustrates the configuration of the magnetic shielding of the hydrogen maser of FIG. 1;

FIG. 3 schematically illustrates the hydrogen maser itself of FIG. 1;

FIG. 4 is a block diagram of a hydrogen maser incorporating the degaussing arrangement of the present invention, and FIG. 5 schematically illustrates the magnetic shielding of the hydrogen maser of FIG. 4.

As illustrated in FIG. 1, hydrogen maser 100 (which is shown in more detail in FIG. 3, discussed below) is surrounded by magnetic shielding 102 (shown in more detail in FIG. 2, discussed below). Situated outside of magnetic shielding 102 are D.C. axial magnetic field current supply 104, A.C. transverse degaussing magnetic field current supply 106, vacuum pump and excited hydrogen (H) source and drain 108, and heating current supply 110.

As shown in FIG. 1, D.C. axial field current supply 104 and A.C. transverse degaussing magnetic field current supply 106 are electrically coupled through connections 112 and 114 as respective inputs to hydrogen maser 110. In order to reach hydrogen maser 100, connections 112 and 114 must pass through magnetic shielding 102. Similarly, tube 116, which couples hydrogen atoms between block 108 and hydrogen maser 100, and tube 118, which couples the resonant cavity of hydrogen maser 100 to a vacuum pump in block 108, pass through magnetic shielding 102. Heating current supply 110 is electrically coupled through connection 120 to each of a plurality of thermostatically-controlled ovens situated within magnetic shielding 102. The maser output oscillations from hydrogen maser 100 are coupled to the outside through electrical connection 122, which passes through magnetic shielding 102. The maser output oscillations present on connection 122 may be applied as a frequency standard control input to frequency synthesizer 124, which derives a useful clock output at a certain selected frequency which is synchronously related to the frequency of the hydrogen maser output oscillations.

Maser 100, shown in FIG. 3, comprises resonant cavity 300 in which is disposed bulb 302. Resonant cavity 300 is evacuated through tube 118, discussed above, while bulb 302, which may be made of a Teflon film, is filled with hydrogen atoms from tube 116. Surrounding resonant cavity 300, and oriented in coaxial relationship therewith, is coil form 304 on which helical coil winding 306 is disposed. Both resonant cavity 300 and coil form 304 are composed of a material exhibiting an insignificant magnetic permeability. Resonant cavity 300, which must be electrically conductive, may be composed of a metal, such as aluminum for example, or alternatively, a metal-plated ceramic. Coil form 304 may be composed of either a non-metal or a metal, such as aluminum, for example.

Although not specifically shown in FIG. 3, connection 114 from A.C. transverse degaussing magnetic field current supply 106 may be connected to resonant cavity 300 to permit the degaussing current to flow axially through the entire length of resonant cavity 300. Alternatively, if coil form 304 is metallic, connection 114 may be connected to coil form 304 to cause degaussing current to flow axially through the length of coil form 304. Another possible alternative would be to provide maser 100 with a separate and distinct additional cylindrical metallic member whose sole purpose would be to carry the axial degaussing current. The effect of such an axially directed degaussing current is discussed in more detail below.

Magnetic shielding 102, shown in FIG. 2, comprises four spaced ferromagnetic cylindrical cans 200, 202, 204 and 206 of graduated size. As shown, maser 100, which is indicated schematically by a dashed rectangle, is situated in the interior of smallest magnetic can 200; ferromagnetic can 200 is situated within the interior of next-larger ferromagnetic can 202; ferromagnetic can 202 is situated within the interior of still-larger ferromagnetic can 204, and ferromagnetic can 204 is situated within the interior of largest ferromagnetic can 206. Each of ferromagnetic cans 200, 202, 204 and 206 have a substantial thickness, so as to present a low reluctance to any magnetic field coupled thereto. The effect of magnetic shielding 102 is to substantially isolate maser 100 from magnetic fields (e.g. the earth magnetic field) which exist exterior to largest ferromagnetic can 206.

In practice, the respective spaces 208, 210 and 212 between spaced ferromagnetic cans 200, 202, 204 and 206 are normally filled with a thermal-insulating material and thermostatically-controlled heating current wires (associated with connections 120 from heating current supply 110) to provide a plurality of ovens for thermally isolating maser 100 from the environment exterior to largest ferromagnetic can 206. However, since the present invention does not relate to such ovens, they have been omitted from FIG. 2 for purposes of clarity.

During operation of maser 100, helical coil winding 306 thereof is energized with current supplied thereto over connection 112 (FIG. 1) from D.C. axial magnetic field current supply 104. This results in the production of D.C. axial magnetic field 214 for maser 100, substantially all of which D.C. axial magnetic field is confined within innermost ferromagnetic can 200 (due to the low reluctance of ferromagnetic can 200).

As discussed above, in order to achieve a precise frequency of oscillation it is essential that the strength of D.C. axial magnetic field 214 be spatially highly uniform over the entire active masing region of maser 100. This requires that no portion of any ferromagnetic cans 200, 202, 204 and 206 exhibit any residual magnetism that might distort the spatial distribution of D.C. axial magnetic field 214. In order to eliminate any such residual magnetism, it is necessary to degauss ferromagnetic cans 200, 202, 204 and 206.

In the prior art, such degaussing is achieved by applying an axial A.C. current through either resonant cavity 300 or coil form 304, as described above. Such an A.C. axial current gives rise to a transverse magnetic field oriented in a direction normal to the axis of maser 100 (i.e. at right angles to the direction of D.C. axial magnetic field 214). As known in the art, a degaussing current is an A.C. current initially having a relatively high amplitude which is then continuously reduced over a period of time towards zero. The purpose of the A.C. degaussing current is to produce an A.C. magnetic field for shaking the positions of the respective magnetic domains of the ferromagnetic object being degaussed to effect a resultant substantially zero net residual magnetic field in the object. To achieve complete degaussing in the direction of the applied degaussing magnetic field (the initial strength of the degaussing field and hence the initial amplitude of the degaussing current) should be sufficiently large to saturate the ferromagnetic object being degaussed. In the case of magnetic shielding 102, the initial strength of the degaussing transverse magnetic field preferably should be sufficient to saturate at least all of interior ferromagnetic cans 200, 202 and 204. Due to the magnetic shielding effect caused by the low-reluctance ferromagnetic cans 200 and 202, it takes a very large initial amplitude of the A.C. axial degaussing current flowing through resonant cavity 300 or coil form 304 to produce a transverse degaussing magnetic field of sufficient strength to saturate all of the ferromagnetic cans 200, 202 and 204 (and a still much larger degaussing current would be required if it were desired to saturate outer ferromagnetic cans 206 as well). In practice, it has been found that this initial axial A.C. degaussing current is usually in the range of 100–300 amperes.

This prior art degaussing arrangement presents serious problems for a maser intended to be situated on a spacecraft in orbit. First, the requirement for a 100–300 ampere current supply puts an undue burden on the on-board electrical power supply. Second, connection 114 must include insulated wires of relatively large diameter to carry 100–300 amperes. This means relatively large size openings are required through the four ferromagnetic cans in order for connection 114 to reach maser 100. Also, the presence of these large openings and the high thermal conductivity of relatively large diameter wires needed for a degaussing current of 100–300 amperes excessively disturbs the required precise thermal equilibrium provided by the above-described plurality of ovens. Further, it is difficult for a spacecraft to dissapate into space the large amounts of extra heat produced by this large amplitude degaussing current.

Another problem with the prior art degaussing arrangement is that it employs a magnetic field which is oriented in a transverse direction with respect to the axis of the maser, while the maser D.C. magnetic field is oriented along the maser axis. It would be more optimum for the magnetic shielding to be degaussed in a direction parallel to the axis of the maser, rather than transverse thereto, in order to insure that there is no net residual magnetism of any portion of the magnetic shielding in the maser D.C. field direction, which is parallel to the maser axis.

A hydrogen maser employing the degaussing arrangement to the present invention is shown in FIGS. 4 and 5. The hydrogen maser shown in FIG. 4 differs from the hydrogen maser shown in FIG. 1 in only two respects. First, A.C. axial degaussing magnetic field current supply 400, coupled to hydrogen maser 100 by connection 402 (shown in FIG. 4), is substituted for A.C. transverse degaussing magnetic field current supply 106 coupled to hydrogen maser 100 by connection 114 (shown in FIG. 1). Second, magnetic shielding 404 (shown in more detail on FIG. 5, discussed below) is substituted for magnetic shielding 120 (shown in more detail in FIG. 2, discussed above.)

As indicated by the reference numerals common to both FIGS. 2 and 5, magnetic shielding 404 differs structurally from magnetic shielding 102 only by including three extra helical windings 500, 502 and 504 (in addition to innermost helical winding 306 used to provide the D.C. axial magnetic field for maser operation in both the prior art maser and in the maser of the present invention.) Specifically, as shown in FIG. 5, all of helical windings 500, 502 and 504 are oriented in coaxial relationship with helical winding 306 and the axis of the maser. As shown, helical winding 500 is situated within space 308 in proximity to the outside of ferromagnetic can 200; helical winding 502 is situated in space 210 in proximity to the outside of ferromagnetic can 202 and helical winding 504 situated in space 212 in proximity to the outside of ferromagnetic can 204.

During degaussing of the magnetic shielding, all of the helical coil windings 306, 500, 502 and 504 are energized with A.C. degaussing current applied thereto over connection 402 from A.C. axial degaussing magnetic field current supply 400. In general, the number of turns of each of windings 306, 500, 502 and 504 need not be the same as each other and the current supplied, at any instant, to each of these coils need not be the same as each other. However, as discussed in quantitative terms below, the simplest and, therefore, preferred structure for windings 306, 500, 502 and 504 is that they all have the same number of turns and carry the same value of degaussing current. Further, as indicated in FIG. 5 by each "x" or by each "dot" within a coil winding circle, the direction of current flow through winding 500 is reversed with respect to that through winding 306; the direction of current flow through winding 502 is reversed with respect with that through winding 500, and the direction of current flow through winding 504 is reversed with respect to that through winding 502. The resultant axial degaussing magnetic field within magnetic shielding 404 is indicated by lines 506.

With the degaussing coil configuration shown in FIG. 5, it is possible to provide complete degaussing of the three inner ferromagnetic cans and partial degaussing of the outer ferromagnetic can with a maximum A.C. current of only 1 ampere, as computed below. Specifically, let the subscript 1 refer to the innermost one of each of the following different sets of four parameters and the subscript 4 refer to the outermost one of each of the following different sets of four parameters:

$L_1$, $L_2$, $L_3$, $L_4$ = lengths of respective ferromagnetic shield cans $r_1$, $r_2$, $r_3$, $r_4$ = radius of respective ferromagnetic shield cans $N_1$, $N_2$, $N_3$, $N_4$ = turns in coils 306, 500, 502 and 504, respectively $t_1$, $t_2$, $t_3$, $t_4$ = thickness of each ferromagnetic shield can respectively $B_1$, $B_2$, $B_3$, $B_4$ = flux density in each ferromagnetic shield can $I_1$, $I_2$, $I_3$, $I_4$ = current in each coil Assuming that the reluctance of the magnetic circuits in the air gaps is very large compared to the reluctances through the ferromagnetic shield cans.

$$B_1 = \frac{0.4\pi N_1 I_1}{L_1}\left(\frac{r_1}{2t_1}\right) + \frac{0.4\pi N_2 I_2}{L_2 - L_1}\left(\frac{r_1}{2t_1}\right)$$

$$B_2 = \frac{0.4\pi N_1 I_2}{L_2 - L_1}\left(\frac{r_2}{2t_2}\right) + \frac{0.4\pi N_2 I_3}{L_3 - L_2}\left(\frac{r_2}{2t_2}\right)$$

$$B_3 = \frac{0.4\pi N_3 I_3}{L_3 - L_2}\left(\frac{r_3}{2t_3}\right) + \frac{0.4\pi N_4 I_4}{L_4 - L_3}\left(\frac{r_3}{2t_3}\right)$$

$$B_4 = \frac{0.4\pi N_4 I_4}{L_4 - L_3}\left(\frac{r_4}{2t_4}\right)$$

If $N_1 = N_2 = N_3 = N_4 = N$
$I_1 = I_2 = I_3 = I_4 = I$
$t_1 = t_2 = t_3 = t_4$ $$B_1 = \frac{0.4\pi NIr_1}{2t}\left(\frac{1}{L_1} + \frac{1}{L_2 - L_1}\right)$$

$$B_2 = \frac{0.4\pi NIr_2}{2t}\left(\frac{1}{L_2 - L_1} + \frac{1}{L_3 - L_2}\right)$$

$$B_3 = \frac{0.4\pi NIr_3}{2t}\left(\frac{1}{L_3 - L_2} + \frac{1}{L_3 - L_2}\right)$$

$$B_4 = \frac{0.4\pi NIr_4}{2t}\left(\frac{1}{L_4 - L_3}\right)$$

Using dimensions of shields for the design being proposed, the values of flux densities which will be produced in the ferromagnetic shield cans follow.

$L_1$ = 12.5 inches or 31.75 cm
$L_2 - L_1$ = 1.5 inches or 3.81 cm
$L_3 - L_2$ = 1.0 inches of 2.54 cm
$L_4 - L_3$ = 8.5 inches or 21.59 cm
$r_1$ = 5.8 inches or 14.73 cm
$r_2$ = 6.4 inches or 16.26 cm
$r_3$ = 6.9 inches or 17.53 cm
$r_4$ = 7.5 inches or 19.05 cm
N = 12.5 × 25 or 312 turns per coil
t = 0.020 inch or 0.0506 cm
I = 1 ampere $$B_1 = \frac{0.4\pi \times 312 \times 1 \times 14.73}{2 \times 0.0506}\left(\frac{1}{31.75} + \frac{1}{3.81}\right)$$

$$B_1 = 3874 \times 14.75\left(\frac{1}{31.75} + \frac{1}{3.81}\right) = 16{,}798 \text{ gauss}$$

$$B_2 = 3874 \times 16.26\left(\frac{1}{3.81} + \frac{1}{2.54}\right) = 41{,}332 \text{ gauss}$$

$$B_3 = 3874 \times 17.53 \left( \frac{1}{2.54} + \frac{1}{21.59} \right) = 29{,}882 \text{ gauss}$$

$$B_4 = 3874 \times 19.05 \left( \frac{1}{21.59} \right) = 3418 \text{ gauss}$$

The above typical calculations show that with a modest current (1 ampere) in practical coils (25 turns per inch of #24AWG) it is possible to exceed saturation flux values (approximately 8000 gauss for a ferromagnetic material such as Molypermalloy) by several times for the three inner shields, which would more than adequately degauss them. To saturate the outer shield requires a larger current through the outer coil; however, effective degaussing probably does not require shaking the domains of the outer shield to saturation levels, only shaking them enough to successively reverse the direction of net magnetization.

The degaussing technique of the present invention is attractive since: (1) reasonable values of degaussing A.C. currents are required, which can readily be produced by spacecraft compatible electronics; and (2) the thermal isolation between the various thermally controlled volumes of the maser, and in particular, the volume enclosing the cavity, is minimally disturbed by thermal conductivity of the small wires entering the volume.

After degaussing of the magnetic shielding is completed, the maser of FIG. 1 and FIG. 4 are operated in the same manner. Specifically, winding 306 is energized through connection 112 with current from D.C. axial magnetic field current supply 104, while, in FIG. 5, coils 500, 502 and 504 remains unenergized. Vacuum pump and excited H source and drain 108 meters hydrogen molecules ($H_2$) from a high-pressure cylinder into a region through which a high radio frequency (e.g. 100 MHz) electromagnetic field is applied. This dissociates the hydrogen molecules into hydrogen atoms (H) and excites the hydrogen atoms into a plurality of different higher energy states. The excited hydrogen atoms pass through an energy-state selector which diverts only those excited hydrogen atoms in the two highest excited states into tube 116. At the same time, a vacuum pump, such as an ion pump, attempts to evacuate tube 116. The overall effect is to fill bulb 302 of maser 100 with an extremely low pressure gas of properly excited hydrogen atoms. Further, the hydrogen atoms in this gas are continuously changing at a mean rate such that, on the average, a hydrogen atom remains present in tube 116 and bulb 302 for approximately 1 second. A separate vacuum pump (e.g. ion pump) within block 108 is coupled to tube 118 for maintaining a high vacuum within resonant cavity 300. The hydrogen pressure within bulb 302 is only slightly higher than the high vacuum within resonant cavity 300.

As known in the maser art, the excited hydrogen atoms within resonant cavity 300 are stimulated to emit oscillations of microwave energy at a precise microwave frequency, whose exact value is affected by the strength of the D.C. magnetic field. By way of example, a hydrogen maser, of the type described herein, is capable of producing a nominal frequency of 1420405751.68 Hz with a long-term frequency stability within a range of 1420405751.308 Hz to 1420405751.826 Hz.

What is claimed is:

1. A degaussing arrangement for a maser surrounded by magnetic shielding, wherein said shielding comprises a plurality of spaced ferromagnetic cans of graduated size each of which encloses all cans smaller than itself, wherein said maser is situated within the interior of the smallest and hence innermost one of said cans, and wherein said maser includes a given helical coil winding situated within the interior of said innermost can and adapted to produce within the interior of said innermost can during operation of the maser a substantially uniform D.C. magnetic field in a direction substantially parallel to the axis of said given helical coil winding in response to a D.C. current flowing through said given helical coil winding; said degaussing arrangement comprising:

said given helical coil winding and at least one additional helical coil winding oriented substantially coaxial with said given helical coil winding, any additional helical coil winding being situated exterior to said innermost can and within a space between two adjacent ones of said cans, whereby degaussing of said shielding is achieved by simultaneously applying A.C. degaussing current to said given and additional helical coil windings.

2. The degaussing arrangement defined in claim 1, wherein said one additional helical coil winding is situated within the space defined by said innermost can and said can which is next larger than said innermost can.

3. The degaussing arrangement defined in claim 2, wherein the number of cans in said plurality is n, wherein n is a predetermined integer at least equal to three, whereby there are n−1 spaces between adjacent ones of said cans, and wherein a separate additional helical coil winding oriented substantially coaxial with said given helical coil winding is situated in every one of said n−1 spaces, whereby said degaussing arrangement includes n−1 additional helical coil windings.

4. The degaussing arrangement defined in claim 1, further including an A.C. degaussing magnetic field current supply, and means for coupling said current supply to said given and additional helical coil windings to thereby apply A.C. degaussing current to said given and additional helical coil windings.

5. The degaussing arrangement defined in claim 4, wherein the respective number of turns of each helical coil winding and degaussing current therethrough produces a resultant degaussing magnetic field in said cans sufficient to saturate at least all ferromagnetic cans except the outermost one of said cans.

6. The degaussing arrangement defined in claim 5, wherein all said helical coil windings have the same number of turns as each other and all said helical coils have the same degaussing current applied therethrough.

7. The degaussing arrangement defined in claim 6, wherein the number of cans in said plurality is n, wherein n is a predetermined integer at least equal to three, whereby there are n−1 spaces between adjacent ones of said cans, and wherein a separate additional helical coil winding oriented substantially coaxial with said given helical coil winding is situated in every one of said n−1 spaces, whereby said degaussing arrangement includes n−1 additional helical coil windings.

8. The degaussing arrangement defined in claim 7, wherein said predetermined integral number n is four.

9. The degaussing arrangement defined in claim 7, wherein the initial A.C. degaussing current through each helical coil winding is in the order of one ampere.

* * * * *